US009776865B2

(12) United States Patent
Smith et al.

(10) Patent No.: US 9,776,865 B2
(45) Date of Patent: *Oct. 3, 2017

(54) INDUCTION-COUPLED PLASMA SYNTHESIS OF BORON NITRIDE NANOTUBES

(71) Applicant: BNNT, LLC, Newport News, VA (US)

(72) Inventors: Michael W. Smith, Newport News, VA (US); Kevin C. Jordan, Newport News, VA (US); Jonathan C. Stevens, Williamsburg, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,485

(22) Filed: Oct. 31, 2014

(65) Prior Publication Data

US 2015/0125374 A1    May 7, 2015

Related U.S. Application Data

(60) Provisional application No. 61/898,542, filed on Nov. 1, 2013.

(51) Int. Cl.
| | | |
|---|---|---|
| *B01J 10/00* | (2006.01) | |
| *B01J 19/08* | (2006.01) | |
| *C01B 21/064* | (2006.01) | |

(52) U.S. Cl.
CPC ......... *C01B 21/0641* (2013.01); *B01J 10/005* (2013.01); *B01J 19/08* (2013.01); *C01B 21/064* (2013.01); *B01J 2219/0898* (2013.01); *C01P 2004/13* (2013.01); *C01P 2004/133* (2013.01)

(58) Field of Classification Search
None
See application file for complete search history.

(56) References Cited

U.S. PATENT DOCUMENTS

| | | |
|---|---|---|
| 5,932,294 A | 8/1999 | Colombo et al. |
| 8,206,674 B2 | 6/2012 | Smith et al. |
| 8,703,023 B2 | 4/2014 | Sainsbury |
| 2002/0113335 A1 | 8/2002 | Lobovsky et al. |

(Continued)

FOREIGN PATENT DOCUMENTS

| | | |
|---|---|---|
| WO | 2014169382 | 10/2014 |
| WO | 2015164777 | 10/2015 |

OTHER PUBLICATIONS

Smith et al., Very Long Single and Few-walled Boron Nitride Nanotubes via the Pressurized Vapor/Condenser Method, Nanotechnology, 2009.

(Continued)

*Primary Examiner* — Guinever S Gregorio
(74) *Attorney, Agent, or Firm* — Joshua B. Brady; Williams Mullen, P.C.

(57) ABSTRACT

Described herein are processes and apparatus for the large-scale synthesis of boron nitride nanotubes (BNNTs) by induction-coupled plasma (ICP). A boron-containing feedstock may be heated by ICP in the presence of nitrogen gas at an elevated pressure, to form vaporized boron. The vaporized boron may be cooled to form boron droplets, such as nanodroplets. Cooling may take place using a condenser, for example. BNNTs may then form downstream and can be harvested.

19 Claims, 2 Drawing Sheets

(56) References Cited

U.S. PATENT DOCUMENTS

| | | | |
|---|---|---|---|
| 2005/0118090 A1* | 6/2005 | Shaffer | B01J 19/088 423/447.1 |
| 2009/0117021 A1 | 5/2009 | Smith et al. | |
| 2010/0192535 A1 | 8/2010 | Smith et al. | |
| 2011/0140318 A1 | 6/2011 | Reeves et al. | |
| 2012/0168299 A1 | 7/2012 | Whitney et al. | |
| 2013/0064750 A1* | 3/2013 | Zettl | C04B 35/6229 423/290 |
| 2015/0033937 A1 | 2/2015 | Lashmore | |

OTHER PUBLICATIONS

Wang et al., Recent Advancements in Boron Nitride Nanotubes, Nanoscale, 2010, 2, 2028-2034.

K. S. Kim, C. T. Kingston, A. Hrdina, M. B. Jakubinek, J. Guan, M. Plunkett and B. Simard, ACS Nano, 2014, 8, 6211.

A. Fathalizadeh, T. Pham, W. Mickelson and A. Zettl, Nano Lett., 2014, 14, 4881.

U.S. International Search Report and Written Opinion for PCT/US2014/63349, USPTO, dated Feb. 15, 2015.

U.S. International Search Report and Written Opinion for PCT/US2015/27570, USPTO, dated Aug. 7, 2015.

U.S. International Search Report and Written Opinion for PCT/US2015/058615, USPTO, dated Jan. 19, 2016.

* cited by examiner

INDUCTION-COUPLED PLASMA SYNTHESIS OF BORON NITRIDE NANOTUBES

CROSS REFERENCE TO RELATED APPLICATIONS

This application claims the benefit of U.S. Provisional Application No. 61/898,542, filed Nov. 1, 2013, the contents of which are incorporated by reference in their its entirety.

STATEMENT REGARDING GOVERNMENT SUPPORT

None.

FIELD OF THE APPLICATION

This application relates to processes and apparatus for the large-scale synthesis of boron nitride nanotubes (BNNTs).

INTRODUCTION

BNNTs are useful, inorganic, long-chain molecules. Wang et al., Recent Advancements in Boron Nitride Nanotubes, Nanoscale, 2010, 2, 2028-2034, provide a recent summary of the structure, property, and uses of boron nitride nanotubes (BNNTs). Wang et al. also list several contemporary techniques used to synthesize BNNTs. These contemporary techniques include, for example: plasma-enhanced pulsed-laser deposition (PE-PLD), plasma-enhanced chemical vapor deposition (PE-CVD), pressurized vapor/condenser method (PVC), arc-discharge, laser vaporization, BN substitution method from CNT templates, chemical vapor deposition (CVD) using borazine, induction heating boron oxide CVD (BOCVD), high-temperature ball milling, and combustion of $Fe_4N/B$ powders.

These methods can be broadly divided into two categories: high temperature synthesis and low temperature synthesis. An example of low temperature synthesis (e.g., synthesis at a temperature well below the vaporization temperature of boron) is BOCVD. A common high temperature synthesis approach (e.g., using temperatures above the vaporization temperature of boron) is the PVC method, which is also generally referred to as high temperature and pressure synthesis, or HTP. Typically, existing HTP methods produce long, flexible, single-to-few walled BNNTs (mostly two walls and less than about six walls, and less than about 10 nm diameter) with few defects and parallel concentric walls. We have observed in previous work, HTP-grown BNNTs as long as 200 microns. HTP synthesis is accomplished without the use of catalysts, or other intermediary species. With low temperature methods, BNNT formation requires catalysts or additional precursors, for instance $Li_2O$, or MgO, in addition to boron and nitrogen feedstocks. Often, CVD grown tubes have smaller aspect ratios, grow to much larger diameters (near 100 nm diameter), and are less flexible than HTP-grown tubes. A severe shortcoming of current HTP implementations is low production rate, typically only 10's of milligrams per hour using kW-class lasers as the heat source.

As is evidenced by the current lack of any commercial source of BNNTs, all of the contemporary synthesis methods have severe shortcomings, including one or more of having low yield, short tubes, discontinuous production, and, most limiting, poor crystallinity (i.e., many defects in molecular structure). What is needed is a commercially-viable BNNT synthesis process that can produce long, flexible, molecules with few crystalline structure defects, and significant yields over contemporary processes.

SUMMARY

Incorporating inductively-coupled plasma (ICP) into BNNT synthesis results in a commercially viable process that can produce long, flexible, molecules with few crystalline structure defects, and significant yields over contemporary processes. ICP is described in U.S. Pat. No. 3,694,618 and U.S. Patent Publication 2012/0261390, for example, the contents of which are incorporated by reference in their entirety. Although ICP has been used in the synthesis of various nanopowders and carbon nanotubes, BNNTs grow by a different chemical mechanism than carbon nanotubes (CNTs). ICP methods for such synthesis are therefore inapplicable to BNNT synthesis. Moreover, ICP allows the BNNT synthesis process to achieve pressure and temperature conditions that drive the HTP synthesis method at much higher production rates and improved end product quality and yield than would be expected. For example, in BNNT synthesis, a target critical temperature for HTP is the vaporization temperature of boron, which is above approximately 4000 C at atmospheric pressure. A target critical pressure is generally between 2 and 12 atmospheres. ICP may be used in BNNT synthesis to achieve those target conditions, and produce commercially-viable and high quality (e.g., long, single-to-few walled, high-aspect ratio, highly crystalline) products. Additionally, the ICP-based BNNT synthesis methods described herein may be performed in the absence of catalysts or intermediary species. For instance, only boron and nitrogen participate in the BNNT self-assembly process in some embodiments of the methods, such that the reactants consist essentially of nitrogen and the boron-containing feedstock. (Impurities in the boron-containing feedstock are not considered reactants in this disclosure.) Catalysts and intermediary species, such as $H_2$, are not necessary in such embodiments, thereby making the methods described herein more economically viable.

The ICP-based BNNT synthesis methods described herein offer additional advantages. For example, ICPs offer several unique and important advantages as the energy source used to drive the HTP BNNT formation method. Specifically, ICPs permit continuous operation of the synthesis apparatus, provide the high temperatures across a broad spatial region that result in uniform nanotube precursors, and produce low flow velocities/high residence times to enable complete vaporization of the boron feedstock, nucleation of boron droplets, and growth of BNNT. Also, ICPs have no consumable electrodes. Electrode erosion is a persistent problem in transferred and non-transferred AC or DC electric arcs, as it can introduce foreign species into the reaction zone that may inhibit the formation of BNNTs and/or contaminate the nanotubes. ICPs have been constructed and tested at power levels up to 100 kW, which will enable high throughput synthesis of BNNTs. The improvements associated with using ICP-based synthesis enable the manufacturing of high quality BNNTs on the industrial scale of kilograms per day, as is currently achieved with other ICP-synthesized materials, like micron-sized metal powders.

An object of this disclosure is to present new methods of BNNT synthesis to overcome the failings of contemporary synthesis methods, and generate high quality nanotubes in large quantities and in commercially-viable processes. Generally, high quality BNNTs have about two to six walls, a diameter of less than about 10 nm, and an aspect ratio greater than about 1000 and as much as about one million. The methods described herein use ICP to drive an HTP method of BNNT synthesis at greatly increased production rates, including more than ten times the rates achieved using contemporary methods.

Embodiments of a process for synthesizing boron nitride nanotubes (BNNTs) may include introducing nitrogen gas and a boron-containing feedstock into a chamber, heating the nitrogen gas and boron-containing feedstock with an induction-coupled plasma to form heated reactants, introducing asperities downstream of the heated reactants to trigger formation of BNNTs, and collecting the BNNTs. The heated reactants may comprise boron nanodroplets. The BNNTs may be single-to-few walled, and may be greater than 50 microns long. The asperities comprise, for example, a condenser. The condenser may be, as examples, a copper rod, a tungsten wire, a network of copper rods, a network of tungsten wires, a grid of copper rods, a grid of tungsten wires, or a combination. In some embodiments, the process proceeds without catalysts, i.e. with no reactive feedstock other than boron and nitrogen. In some embodiments, the reactants are maintained at an elevated pressure, such as an elevated pressure of at least 2 atmospheres to about 250 atmospheres, or, for example, an elevated pressure of at least 2 atmospheres to about 12 atmospheres.

Embodiments of a process for synthesizing BNNTs may include dispersing reactants such as nitrogen gas and a boron-containing feedstock into a chamber at an elevated pressure, heating, with an induction-coupled plasma, the reactants to a temperature greater than the vaporization temperature of the boron-containing feedstock, to form vaporized boron, cooling the vaporized boron to form liquid boron (such as boron nanodroplets), exposing the liquid boron and nitrogen gas to a temperature between boron's melting point and below boron's boiling point; and harvesting BNNTs. Boron-containing feedstock may include, as examples, elemental boron, elemental boron powder, boron nitride, boron nitride powder, cubic boron nitride powder, and hexagonal boron nitride powder. In some embodiments, cooling the vaporized boron is performed with at least one of a condenser and a plurality of asperities. In some embodiments, cooling the vaporized boron may be performed by introducing a plurality of asperities in the form of a condenser.

An apparatus for ICP-based BNNT synthesis may include a chamber configured to maintain nitrogen gas and a boron-containing feedstock at an elevated pressure, a gas inlet configured to introduce nitrogen gas into the chamber at an elevated pressure, a feedstock inlet configured to disperse a boron-containing feedstock into the chamber, an induction-coupled plasma head, a boron droplet nucleation zone, a growth zone, and a collection zone.

DETAILED DESCRIPTION

In accordance with the principles described herein, high quality BNNTs may be synthesized in large, commercially-viable quantities, using ICP. Some embodiments produce commercially-viable and high quality products without the use of catalysts or intermediary species. Embodiments of the processes disclosed herein employ an elevated pressure to drive the BNNT synthesis. Some embodiments use a condenser or other source of asperities to trigger BNNT formation. Some embodiments use natural nucleation of boron droplets (i.e. not induced by forced local cooling).

ICP-based BNNT synthesis may be performed at elevated pressure, such as between 2 atmospheres and 250 atmospheres, and for example, between 2 atmospheres and 12 atmospheres, and as a further example, at about 12 atmospheres. As described in U.S. Pat. No. 8,206,674 B2 to Smith et al., the contents of which are incorporated by reference in their entirety, BNNT synthesis may be performed at elevated pressures, including for example pressures above 1 atmospheres and, for example, between 2 atmospheres and 250 atmospheres. The methods Smith et al. describe employ a laser thermal source to heat a target in a chamber at elevated pressure, from which vapors condense to produce BNNTs without the use of a catalyst. Super-atmospheric pressure is an important component for enhanced HTP methods, and is believed to greatly enhance the supersaturation of boron nitride on the boron droplets which act as nucleation sites for the formation of BNNTs. Smith et al. describe 2 to 250 atmospheres as a suitable range, and describe that 2 atmospheres to 12 atmospheres produces excellent results. Similarly, U.S. Pat. No. 8,753,578 B1 describes a laser-based apparatus and recommends 12 atmospheres as a desirable pressure condition. U.S. Patent Publication 2013/064,750 describes using an arc discharge to produce a plasma jet for the production of BNNTs typically at 600-700 torr but possibly at "several to several hundred atmospheres."

Figure 1:
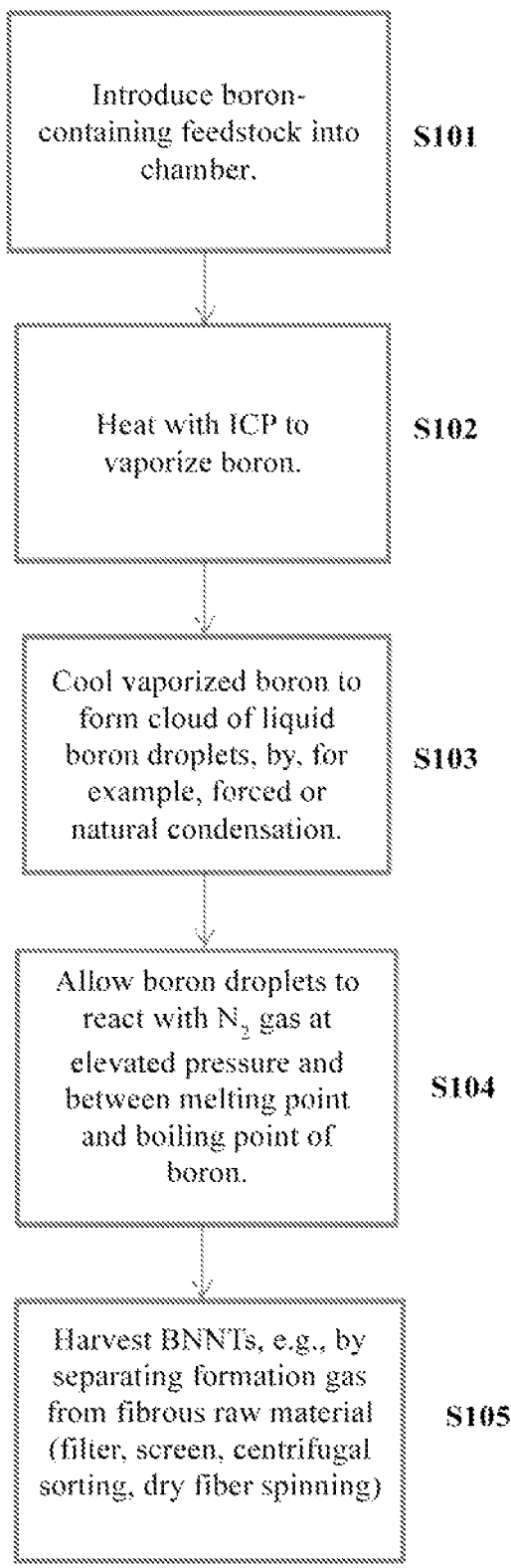
FIG. 1 is a flow chart of an embodiment of a process for ICP-based BNNT synthesis.

FIG. 1 is a flow chart of an embodiment of a process for ICP-based BNNT synthesis. In step S101, a boron-containing feedstock is dispersed into a chamber containing nitrogen gas held at a pressure suitable for HTP BNNT synthesis. The pressure may be an elevated pressure, as described elsewhere herein. An advantage of using ICP is that the feedstock may be continuously fed into the chamber. The feedstock may be fed to the chamber using a mechanical disperser such as a powder disperser, for example, among other known methods for feeding a feedstock to a chamber. For instance, liquid spray injection (atomization) of the boron-containing feedstock may be used, particularly when the solvent produces no chemical interference in the dispersion and synthesis processes.

The boron-containing feedstock introduced at S101 should contain boron, and preferably the boron is in an easily dispersed form. For instance, elemental boron can be dispersed, but many forms are gritty and suffer from inconsistent or less-than-desirable dispersion. Boron nitride (BN) powders may be preferred for many methods. In some methods, BN releases nitrogen during vaporization, and may require the ICP to have additional heating capacity. Cubic BN powders may be suitable, although the diamond-like structure can negatively impact the material flow through the apparatus. Both B and BN powders are available in dozens of industrial grades. Typically smaller particles are harder to disperse, but they vaporize more easily. The best feedstock is one that vaporizes completely with available power and residence time, but costs the least and has the highest throughput. With laser-driven HTP, elemental boron powder and hexagonal boron nitride powder feedstocks have been found to produce good results, generating high quality BNNTs, including BNNTs over 50 microns in length. High resolution transmission electron microscopy (TEM) has been used to confirm the quality of BNNTs produced using elemental boron powder and hexagonal boron nitride powder as boron-containing feedstock.

In step S102, the introduced boron feedstock is heated by ICP to produce boron gas (vapor). Vaporization requires that the dispersed boron temperature be held above its vaporization temperature for a time sufficient to convert it to gas. The duration is dependent on at least the size of the feedstock particles and the local temperature, but typically may be on the order of about 1 millisecond to 100 s of milliseconds. Complete conversion of feedstock to vapor is readily determined by observing under what conditions no residual powdered feedstock is present downstream of the ICP hot zone.

The operating pressure within the chamber (which includes the ICP volume) should be sufficient to drive the HTP method. Generally, an elevated pressure of between 2 and 250 atmospheres will drive the synthesis and achieve high quality BNNTs at strong yields. In some embodiments, the operating pressure is between 2 atmospheres and 12 atmospheres. For example, pressures from about 4 atmospheres to 20 atmospheres have repeatedly produced good results using HTP methods. Additional gases may be employed to improve the performance of the ICP. For instance He or Ar may be added to the ICP to vary the temperature profile within the ICP or to facilitate easier ignition of the plasma. Noble gases such as He and Ar are not chemically reactive, and should not participate chemically, although as buffer gasses they can alter the kinetics. For plasma ignition scenarios, added gasses can be turned off once the plasma is established. Thus, as described herein, the use of a noble gas for plasma ignition does not constitute the use of a catalyst or intermediary species.

In step S103, the boron vapor, now dispersed within the nitrogen carrier gas, is cooled to create small boron droplets. It can be extremely difficult to measure the size of the droplets in situ (i.e., in the plasma) but examination of post-run HTP samples suggest that active droplets are in the range of about 2 nm to about 500 nm, i.e., nanodroplets. In some embodiments, the boron vapor cooling can occur with the natural fall off in temperature as a function of distance from the ICP head. In some embodiments, the boron vapor cooling may be locally induced by a condenser, such as described in U.S. Pat. No. 8,753,578 at column 2, line 3, through column 3, line 36, which are incorporated by reference. The condenser can take many forms, such as, for example, a cooled copper rod or tungsten wire or networks or grids thereof. Primary considerations are that the condenser is capable of surviving the ambient temperature of the boron droplet nucleation zone and that the flowstream can pass readily over/through it. Some embodiments may induce boron vapor cooling using asperities, such as described in U.S. Pat. No. 8,206,674 at, for example, column 2, line 53 through column 6, line 14, which are incorporated by reference. An asperity may also comprise bump, protrusion, or indentation on a surface, such as a metallic surface of a condenser. Generally, an asperity may cause local cooling of the boron vapor flow and subsequent formation of boron droplets or nanodroplets. Some embodiments feature a plurality of asperities that when combined provide a surface that induces the continuous formation of boron droplets from vapor phase. Some embodiments may feature a combination of a condenser and a plurality of asperities. In some embodiments, the condenser includes asperities. The condenser and/or asperities can be used to control where the droplets form, and may enhance the purity of the BNNT product by extending the time in the growth zone. Some embodiments use natural nucleation of boron droplets (i.e.

no forced local cooling). We term the location where the boron droplets form the 'nucleation zone.'

In step S104, the condensed boron droplets are held at a temperature above the melting point of boron and below the boiling point of boron for some time in the elevated-pressure nitrogen environment. In some embodiments, step S104 occurs in a 'growth zone,' in which BNNTs form. The streamwise length of the growth zone can be controlled by a combination of the operating conditions of the ICP and thermal insulation on the walls of the chamber. It is believed that during the time condensed boron droplets are held at a temperature above melting point, the droplets extrude BNNTs through a process of local supersaturation of BN on the surface of, or within the volume of, the liquid boron droplets. This self assembly mechanism is rapid and may proceed without additional chemical components (catalysts such as $Li_2O$ or MgO or intermediaries such as $H_2$), particularly at elevated pressures as described above. Thus, in some embodiments, the chemical reactants consist essentially of nitrogen and boron (as mentioned above, impurities in the boron-containing feedstock, if any, are not considered catalysts or reactants in this disclosure).

In step S105 the nanotubes are harvested, i.e., separated from the nitrogen carrier gas. For the bulk collection of BNNT material, screens or wire mesh filters (for instance stainless steel wire with 5 mm to 1 cm spacing) consistently produce good results. For large-scale embodiments, centrifugal separators may be employed in conjunction with screens. Dry spun structural fibers may also be produced by feeding the cotton like BNNT raw material into dry spinners and weavers. U.S. Pat. No. 7,993,620, incorporated by reference in its entirety, describes a similar process for carbon nanotube fiber.

Figure 2:
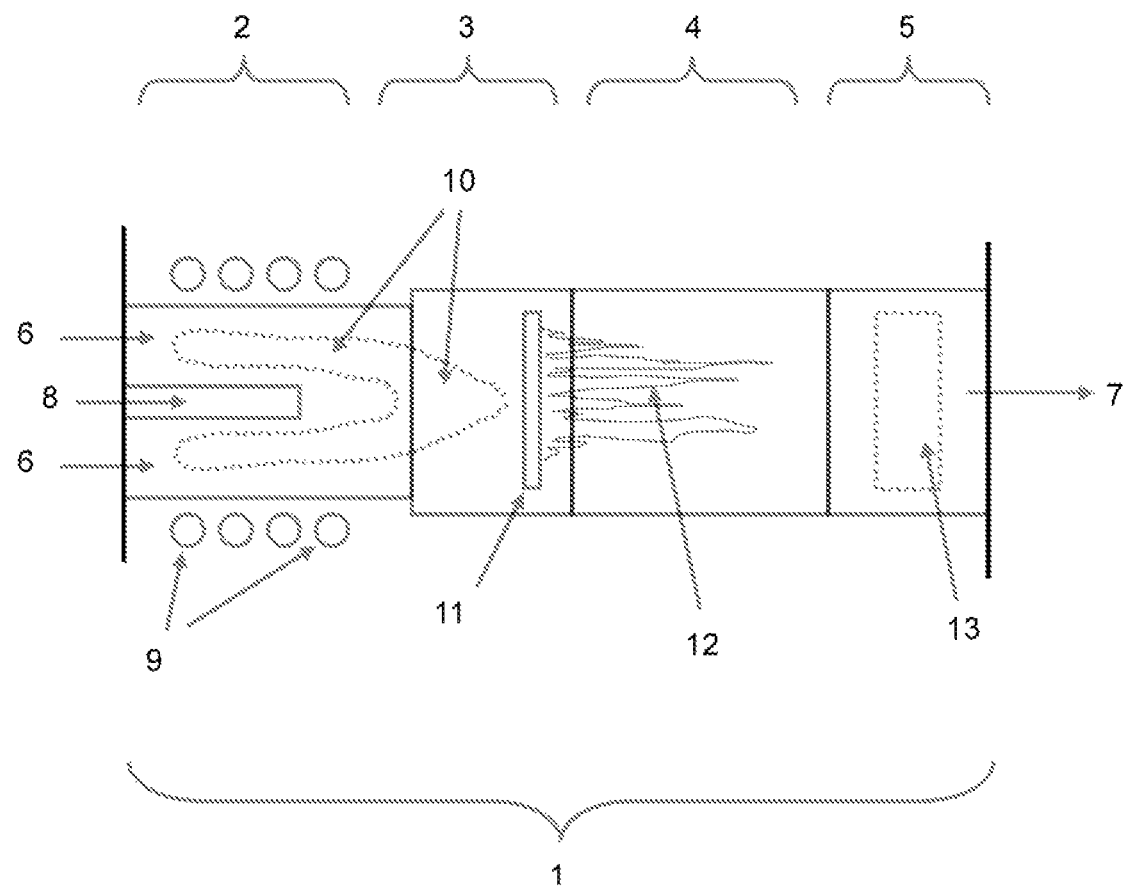
FIG. 2 shows an embodiment of an apparatus for ICP-based BNNT synthesis.

FIG. 2 shows an embodiment of an apparatus 1 for ICP-based BNNT synthesis as described herein. Apparatus 1 may comprise an enclosed chamber, and may have a generally tubular or other convenient cross section. The apparatus 1 may have an ICP region 2, a boron droplet nucleation zone 3, a BNNT growth zone 4, and a collection/harvesting zone 5. The nitrogen carrier gas is introduced to the chamber through gas inlet 6, and the gases exhaust the chamber at exhaust 7. Optional ICP augmentation gases, as described above, may be introduced to the chamber at gas inlet 6. Embodiments of the apparatus 1 may feature a plurality of gas inlets 6. The chamber pressure can be set with conventional gas regulators on the upstream side (not shown in FIG. 1), and the flow rates regulated by conventional variable valves at the exhaust. As described above, operating at an elevated pressure of between about 2 atmospheres to 250 atmospheres, and as an example between about 2 atmospheres to 12 atmospheres, and as a further example at about 12 atmospheres, drives the ICP-based BNNT synthesis process and generates good yields of high quality BNNTs.

The boron-containing feedstock may be introduced to the chamber through a feedstock inlet 8. The feedstock inlet 8 may be, for example, a mechanical disperser or an atomizer, among other devices for feeding the boron-containing feedstock to the apparatus 1. The conventional ICP head includes induction coils 9, positioned around the body of the head to drive the plasma within. The ICP creates a hot region 10 with sufficient temperature to vaporize the chosen feedstock. Embodiments of the apparatus 1 may include condenser 11 that can be positioned in the boron droplet nucleation zone 3, just upstream of the growth zone 4. The condenser can be used to induce nucleation of boron droplets at the most favorable streamwise location within the chamber. A favorable location is one that allows the droplets to be held at a desirable temperature for the extrusion of BNNTs for a time sufficient to completely consume the feedstock. Condenser 11 may comprise, for example, a cooled copper rod or tungsten wire or networks or grids thereof. If natural nucleation of boron droplets is used (i.e. not induced by forced local cooling), the condenser can be omitted.

Cotton-like BNNTs 12 form in the growth zone 5. The growth zone persists over the region where the temperature is sufficiently high that the boron droplets continue to react vigorously with the ambient nitrogen. Some theories suggest that once the boron droplets solidify, BNNT growth is extinguished, or greatly diminished. BNNTs can be collected from the condenser 11 if present, or in the collection zone 13. Harvesting in the collection zone 13 may be accomplished using a number of techniques, such as those described above.

Collection of BNNTs can easily be achieved in batch mode, where sufficient volume is left for the deposition of BNNTs in the collector zone. The BNNTs may be harvested from the volume between operational runs. For a continuous BNNT fiber, the fiber may be spun under pressure (region 13 in FIG. 2) and the fiber passed out of the chamber through a rotating seal (located at position 7 in FIG. 2), or it could be collected on a roll within the pressurized chamber volume.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features integers, steps, operations, elements, and/or components, but do not preclude the presence or addition of one or more other features, integers, steps, operations, elements, components, and/or groups thereof.

The invention may be embodied in other specific farms without departing from the spirit or essential characteristics thereof The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A process for synthesizing boron nitride nanotubes (BNNTs), the process comprising:
    a. introducing a feed consisting of gas including nitrogen and a boron-containing feedstock into a chamber;
    b. heating the nitrogen gas and boron-containing feedstock with an induction-coupled plasma to form heated reactants;
    c. introducing asperities downstream of the heated reactants to trigger formation of BNNTs; and
    d. collecting the BNNTs.

2. The process of claim 1, wherein the BNNTs are at least one of single-to-few walled and greater than 50 microns long.

3. The process of claim 1, wherein the asperities comprise a condenser.

4. The process of claim 3, wherein the condenser comprises at least one of a copper rod, a tungsten wire, a network of copper rods, a network of tungsten wires, a grid of copper rods, and a grid of tungsten wires.

5. The process of claim 1, wherein the process proceeds with no reactive feedstock other than boron and nitrogen.

6. The process of claim 1, wherein the collecting is performed using at least one of a solid surface condenser, collection surfaces, and filters downstream of the growth zone.

7. The process of claim 1, wherein introducing nitrogen gas and a boron-containing feedstock into a chamber is a continuous process.

8. The process of claim 1, wherein collecting BNNTs is a continuous process.

9. The process of claim 1, wherein the chamber is at an elevated pressure of at least 2 atmospheres to about 250 atmospheres.

10. The process of claim 9, wherein the chamber is at an elevated pressure of at least 2 atmospheres to about 12 atmospheres.

11. The process of claim 1, wherein the heated reactants comprise boron nanodroplets.

12. The process of claim 1, wherein the feed is introduced at a feed inlet, and the heated reactants are formed downstream of the feed inlet.

13. A process for synthesizing BNNTs, the process comprising:
    a. dispersing reactants into a chamber at an elevated pressure, wherein the reactants comprise a feed consisting of gas including nitrogen and a boron-containing feedstock;
    b. heating, with an induction-coupled plasma, the reactants to a temperature greater than the vaporization temperature of the boron-containing feedstock, to form vaporized boron;
    c. cooling the vaporized boron to form boron droplets;
    d. exposing the boron droplets and nitrogen gas to a temperature between boron's melting point and below boron's boiling point; and
    e. harvesting BNNTs.

14. The process of claim 13, wherein the elevated pressure is at least 2 atmospheres to about 250 atmospheres.

15. The process of claim 14, wherein the elevated pressure is at least 2 atmospheres to about 12 atmospheres.

16. The process of claim 13, wherein the reactants consist essentially of nitrogen gas and a boron-containing feedstock.

17. The process of claim 13, wherein the boron-containing feedstock comprises at least one of elemental boron, elemental boron powder, boron nitride, boron nitride powder, cubic boron nitride powder, and hexagonal boron nitride powder.

18. The process of claim 13, wherein cooling the vaporized boron is performed with at least one of a condenser and a plurality of asperities.

19. The process of claim 13, wherein cooling the vaporized boron is performed with a condenser comprising at least one of a copper rod, a tungsten wire, a network of copper rods, a network of tungsten wires, a grid of copper rods, and a grid of tungsten wires.

* * * * *